(12) United States Patent
Kondrad et al.

(10) Patent No.: US 10,179,529 B1
(45) Date of Patent: Jan. 15, 2019

(54) SEATBACK WITH A SEATBELT WEBBING RETAINING MEMBER WITH A RELEASABLY COUPLED END TO ALLOW THE INSERTION OF AND TO RETAIN A WEBBING SECTION OF A SEATBELT ASSEMBLY

(71) Applicant: Ford Global Technologies, LLC, Dearborn, MI (US)

(72) Inventors: Marcos Silva Kondrad, Macomb Township, MI (US); Ryan Welch, Ottawa Lake, MI (US); Kevin Mozurkewich, Livonia, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/811,806

(22) Filed: Nov. 14, 2017

(51) Int. Cl.
  *B60R 22/00* (2006.01)
  *B60N 2/68* (2006.01)
  *B60R 22/02* (2006.01)

(52) U.S. Cl.
  CPC .............. *B60N 2/688* (2013.01); *B60R 22/02* (2013.01); *B60R 2022/027* (2013.01)

(58) Field of Classification Search
  CPC .... B60N 2/688; B60R 22/02; B60R 2022/027
  USPC ................................ 297/481, 482, 483, 484
  See application file for complete search history.

(56) References Cited

U.S. PATENT DOCUMENTS

| | | | | | |
|---|---|---|---|---|---|
| 3,844,001 | A | * | 10/1974 | Holmberg .......... | A44B 11/2538 297/483 X |
| 3,856,351 | A | * | 12/1974 | Garvey ................... | B60R 22/19 297/483 X |
| 3,866,975 | A | * | 2/1975 | Fricko ..................... | B60R 22/19 297/483 X |
| 4,730,875 | A | * | 3/1988 | Yoshitsugu ............. | B60R 22/02 297/481 X |
| 5,123,673 | A | * | 6/1992 | Tame ..................... | B60R 22/03 297/484 X |
| 5,158,339 | A | * | 10/1992 | Miyanaga ............... | B60R 22/26 297/482 X |
| 5,678,887 | A | * | 10/1997 | Sher ..................... | B60N 2/2803 297/483 X |
| 5,829,831 | A | * | 11/1998 | Sharman .................. | B60N 2/36 297/483 X |

(Continued)

*Primary Examiner* — Rodney B White
(74) *Attorney, Agent, or Firm* — Vichit Chea; Price Heneveld LLP

(57) ABSTRACT

A seatback for a vehicle comprises a midline. A first upper seatbelt webbing contact portion is disposed to a first side of the midline. A first seatbelt webbing retaining member is disposed to the first side. The first seatbelt webbing retaining member has a medial end, a lateral end further away from the midline than the medial end, and a middle portion between the medial end and the lateral end. Either the medial end or the lateral end of the first seatbelt webbing retaining member is affixed to the seatback and the other of the medial end or the lateral end is releasably coupled to the seatback. The middle portion is disposed above the first upper seatbelt webbing contact portion forming a gap configured to retain a first webbing section of a seatbelt assembly.

20 Claims, 14 Drawing Sheets

(56) References Cited

U.S. PATENT DOCUMENTS

| | | | | |
|---|---|---|---|---|
| 5,897,169 | A * | 4/1999 | Larsen | B60R 22/26 297/483 X |
| 5,931,503 | A * | 8/1999 | Glendon | B60R 22/024 297/483 X |
| 5,971,491 | A * | 10/1999 | Fourrey | B60R 22/1951 297/484 X |
| 6,655,744 | B2 * | 12/2003 | Petri | A44B 11/2511 297/484 X |
| 6,749,223 | B2 * | 6/2004 | Kazuo | B60R 22/20 297/483 X |
| 6,773,078 | B2 | 8/2004 | Dinkel et al. | |
| 6,811,186 | B1 | 11/2004 | Fraley et al. | |
| 7,004,547 | B1 * | 2/2006 | Cheng | B60R 22/19 297/483 X |
| 7,104,570 | B2 * | 9/2006 | Hearn | B60R 22/023 297/481 X |
| 7,131,668 | B2 * | 11/2006 | Go | B60N 2/4221 280/808 |
| 7,273,232 | B2 * | 9/2007 | Fontecchio | B60R 22/022 297/483 X |
| 7,458,636 | B2 * | 12/2008 | Chen | B60N 2/28 297/481 X |
| 7,566,072 | B2 * | 7/2009 | Kokeguchi | B60R 21/18 280/733 |
| 7,625,048 | B2 | 12/2009 | Rouhana et al. | |
| 7,740,271 | B2 * | 6/2010 | Nezaki | B60R 21/18 297/483 X |
| 7,775,557 | B2 * | 8/2010 | Bostrom | B60R 22/343 297/484 X |
| 7,815,256 | B2 * | 10/2010 | Erlingstam | B60N 2/3084 297/484 X |
| 7,862,080 | B2 * | 1/2011 | Hiroshige | B60R 21/18 280/733 X |
| 7,980,635 | B2 * | 7/2011 | Matsushita | B60R 22/03 297/481 X |
| 8,226,115 | B2 * | 7/2012 | Sekizuka | B60R 21/18 297/483 X |
| 8,328,289 | B2 * | 12/2012 | Tharp | B60N 2/2812 297/481 X |
| 8,646,845 | B2 * | 2/2014 | Varcus | B60N 2/688 297/483 X |
| 8,690,258 | B2 * | 4/2014 | Kato | B60N 2/688 297/468 |
| 8,820,790 | B2 * | 9/2014 | Wenz | B60N 2/58 297/483 X |
| 9,302,645 | B1 * | 4/2016 | Shenaq | B60R 22/20 |
| 9,308,890 | B2 | 4/2016 | Rouhana | |
| 9,725,022 | B2 * | 8/2017 | Shenaq | B60N 2/688 |
| 9,725,067 | B2 * | 8/2017 | Shenaq | B60N 2/688 |
| 2002/0011726 | A1 * | 1/2002 | Izume | B60R 22/20 280/801.1 |
| 2007/0069510 | A1 * | 3/2007 | Suyama | B60R 21/207 280/733 |
| 2008/0252058 | A1 | 10/2008 | Gray | |
| 2011/0068615 | A1 * | 3/2011 | Rossmann | B60R 22/26 297/483 |
| 2011/0210592 | A1 * | 9/2011 | Watanabe | B60N 2/22 297/354.1 |
| 2011/0316321 | A1 * | 12/2011 | Kujawa | B60N 2/688 297/468 |
| 2012/0286553 | A1 * | 11/2012 | Sharda | B60N 2/688 297/344.15 |
| 2018/0279791 | A1 * | 10/2018 | Iwakata | A47C 7/746 |
| 2018/0281645 | A1 * | 10/2018 | Tokumoto | B60N 2/686 |

\* cited by examiner

SEATBACK WITH A SEATBELT WEBBING
RETAINING MEMBER WITH A
RELEASABLY COUPLED END TO ALLOW
THE INSERTION OF AND TO RETAIN A
WEBBING SECTION OF A SEATBELT
ASSEMBLY

FIELD OF THE INVENTION

The present invention generally relates to a seatback of a seating assembly for a vehicle to retain various portions of a seatbelt assembly on the seatback and allow for positioning of the seatbelt assembly to fit properly all occupants, even very large and very small occupants.

BACKGROUND OF THE INVENTION

High performance vehicles sometimes include a seating assembly with a seatback through which portions of a seatbelt assembly will pass through. The seatbelt assembly is sometimes of the four-point or five-point harness variety, among other varieties. The seatbacks however do not allow the seatbelt assemblies to fit properly very large or very small occupants of the seating assembly.

SUMMARY OF THE INVENTION

According to a first aspect of the present invention, a seatback for a vehicle comprises: a midline; a first upper seatbelt webbing contact portion disposed to a first side of the midline; and a first seatbelt webbing retaining member disposed to a first side of the midline having a medial end, a lateral end further away from the midline than the medial end, and a middle portion between the medial end and the lateral end; wherein, either the medial end or the lateral end of the first seatbelt webbing retaining member is affixed and the other of the medial end or the lateral end is releasably coupled; and wherein, the middle portion is disposed above the first upper seatbelt webbing contact portion forming a gap configured to retain a first webbing section of a seatbelt assembly.

Embodiments of the first aspect of the invention can include any one or a combination of the following features:
- a second upper seatbelt webbing contact portion disposed to a second side of the midline;
- a second seatbelt webbing retaining member having a medial end, a lateral end further away from the midline than the medial end, and an middle portion between the medial end and the lateral end;
- either the medial end or the lateral end of the second seatbelt webbing retaining member is affixed and the other of the medial end or the lateral end is releasably coupled;
- the middle portion of the second seatbelt webbing retaining member is disposed above the second upper seatbelt webbing contact portion forming a gap configured to retain a second upper seatbelt webbing;
- the medial end of the first seatbelt webbing retaining member is affixed and the lateral end of the first seatbelt webbing retaining member is releasably coupled;
- the medial end of the second seatbelt webbing retaining member is affixed and the lateral end of the second seatbelt webbing retaining member is releasably coupled;
- an upper back support section configured to support the upper back of an occupant, the upper back support section including a top portion;
- a headrest disposed above the top portion of the upper back support section;
- an extension portion elevating the headrest above the upper back support section;
- the medial end of the first seatbelt webbing retaining member and the medial end of the second seatbelt webbing retaining member are attached to the extension portion;
- the extension portion comprises a first member and a second member;
- the medial end of the first seatbelt webbing retaining member is attached to the first member of the extension portion;
- the medial end of the second seatbelt webbing retaining member is attached to the second member of the extension portion;
- the lateral end of the first seatbelt webbing retaining member is releasably coupled through magnetic attraction;
- the lateral end of the second seatbelt webbing retaining member is releasably coupled through magnetic attraction;
- the upper back support section includes an occupant facing surface;
- the lateral end of the first seatbelt webbing retaining member is releasably coupled rearward of the occupant facing surface of the upper back support section;
- the lateral end of the second seatbelt webbing restraint member is releasably coupled rearward of the occupant facing surface of the upper back support section;
- the medial end of the first seatbelt webbing retaining member extends from the first member of the extension portion approximately parallel to the first upper seatbelt webbing contact portion;
- the medial end of the second seatbelt webbing retaining member extends from the second member of the extension portion approximately parallel to the second upper seatbelt webbing contact portion;
- the lateral end of the first seatbelt webbing retaining member is positioned vertically or approximately vertically when releasably coupled;
- the lateral end of the second seatbelt webbing retaining member is positioned vertically or approximately vertically when releasably coupled;
- a headrest and webbing retainer support member attached adjacent to a rearward facing surface of the upper back support section, the headrest and webbing retainer support member being symmetrical about the midline;
- the headrest and webbing retainer support member comprises a headrest attachment portion to which the headrest is attached, the extension portion extending toward the upper back support section from the headrest attachment portion, the first upper seatbelt webbing contact portion extending laterally and downward from the first member of the extension portion, the second upper seatbelt webbing contact portion extending laterally and downward from the second member of the extension portion, a first attachment section extending downward from the first upper seatbelt webbing contact portion, and a second attachment section extending downward from the second upper seatbelt webbing contact portion;
- the lateral end of the first seatbelt webbing retaining member is releasably coupled to the first attachment section of the headrest and webbing retainer support member;

the lateral end of the second seatbelt webbing retaining member is releasably coupled to the second attachment section of the headrest and webbing retainer support member;

the first attachment section includes a magnet;

the second attachment section includes a magnet;

the lateral end of the first seatbelt webbing retaining member including a metal piece;

the lateral end of the second seatbelt webbing retaining member including a metal piece;

the lateral end of the first seatbelt webbing retaining member is releasably coupled to the first attachment section because the metal piece of the lateral end of the first seatbelt webbing retaining member is magnetically attracted to the magnet of the first attachment section; and the lateral end of the second seatbelt webbing retaining member is releasably coupled to the second attachment section because the metal piece of the lateral end of the second seatbelt webbing retaining member is magnetically attracted to the magnet of the second attachment section.

According to a second aspect of the present invention, a method of utilizing a seatbelt assembly with a seating assembly in a vehicle comprising: presenting a vehicle including a seating assembly with the seatback with according to the first aspect of the present invention; releasing the releasably coupled medial end or lateral end of the first seatbelt webbing retaining member; placing the first webbing section of the seatbelt assembly between the first upper seatbelt webbing contact portion and the first seatbelt webbing retaining member so that the first webbing section contacts the first upper seatbelt webbing contact portion; and recoupling the releasably coupled medial end or lateral end of the first seatbelt webbing retaining member that was previously released.

Embodiments of the second aspect of the invention can include any one or a combination of the following features:

releasing the releasably coupled medial end or lateral end of the second seatbelt webbing retaining member;

placing the second webbing section of the seatbelt assembly between the second upper seatbelt webbing contact portion and the second seatbelt webbing retaining member so that the second webbing section contacts the second upper seatbelt webbing contact portion;

recoupling the releasably coupled medial end or lateral end of the second seatbelt webbing retaining member that was previously released;

releasing the releasably coupled lateral end of the first seatbelt webbing retaining member;

releasing the releasably coupled lateral end of the second seatbelt webbing retaining member;

recoupling the lateral end of the first seatbelt webbing retaining member;

recoupling the lateral end of the second seatbelt webbing retaining member;

placing the first webbing section of the seatbelt assembly laterally of the extension portion away from the midline;

placing the second webbing section of the seatbelt assembly laterally of the extension portion away from the midline;

placing the first webbing section of the seatbelt assembly laterally of the first member of the extension portion away from the midline;

placing the second webbing section of the seatbelt assembly laterally of the second member of the extension portion away from the midline;

overcoming the magnetic attraction releasably coupling the first seatbelt webbing retaining member;

overcoming the magnetic attraction releasably coupling the second seatbelt webbing retaining member;

securing the seatbelt assembly over an occupant of the seating assembly;

positioning the first webbing section on the first upper seatbelt webbing contact portion to accommodate a height of the occupant;

positioning the second webbing section on the second upper seatbelt webbing contact portion to accommodate the height of the occupant;

releasing the releasably coupled lateral end of the first seatbelt webbing retaining member from the first attachment section of the headrest and webbing retainer support member;

releasing the releasably coupled lateral end of the second seatbelt webbing retaining member from the second attachment section of the headrest and webbing retainer support member;

recoupling the releasably coupled lateral end of the first seatbelt webbing retaining member to the first attachment section of the headrest and webbing retainer support member;

recoupling the releasably coupled lateral end of the second seatbelt webbing retaining member to the second attachment section of the headrest and webbing retainer support member;

overcoming the magnetic attraction between the metal piece of the lateral end of the first seatbelt webbing retaining member and the magnet of the first attachment section; and overcoming the magnetic attraction between the metal piece of the lateral end of the second seatbelt webbing retaining member and the magnet of the second attachment section.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
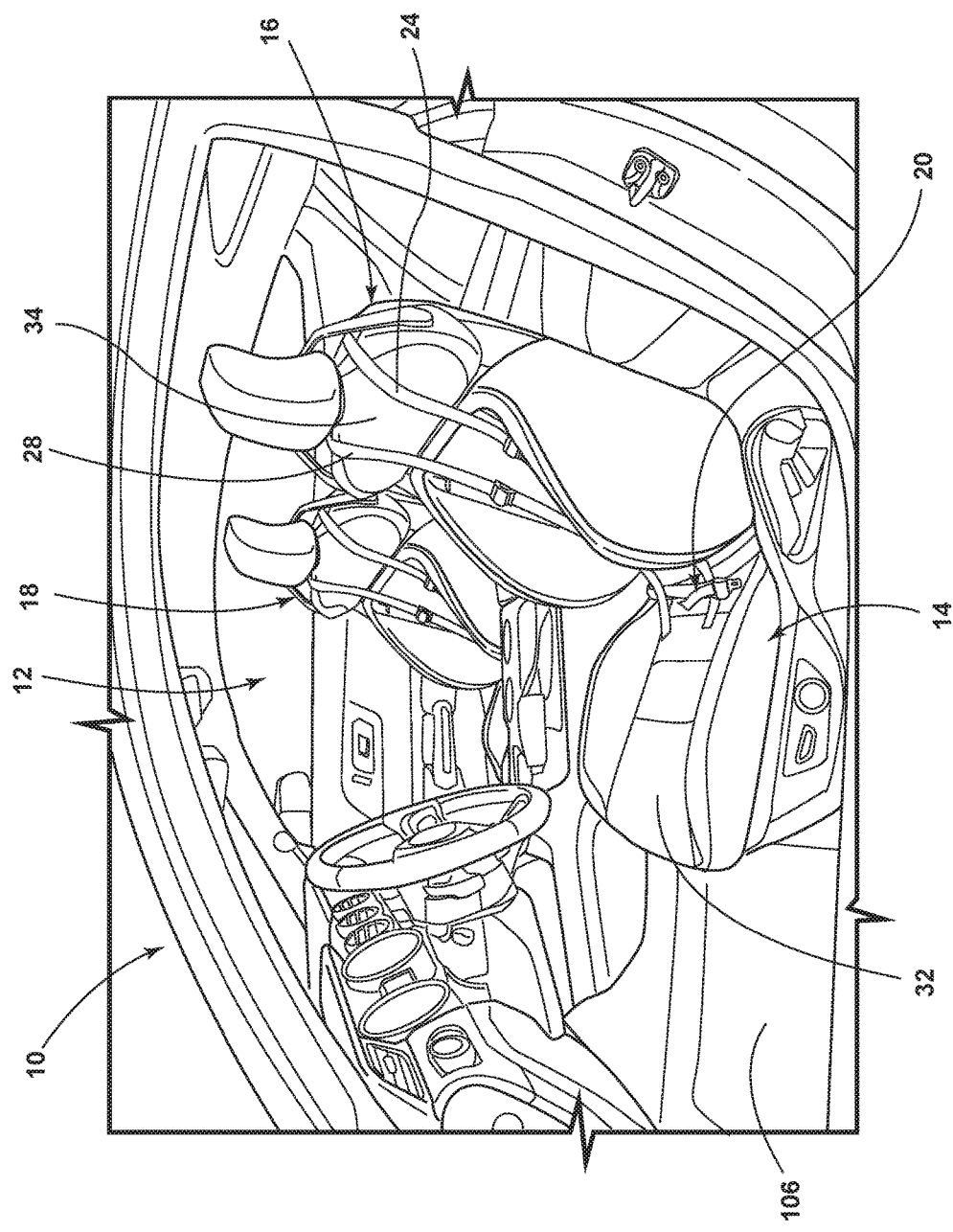
FIG. 1 is a perspective view of an interior of a vehicle, illustrating a first seating assembly with a seatback and a seatbelt assembly.

For purposes of description herein, the terms "inboard," "outboard," "forward," "rearward," "above," "beneath," "downward," "upward," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 9:
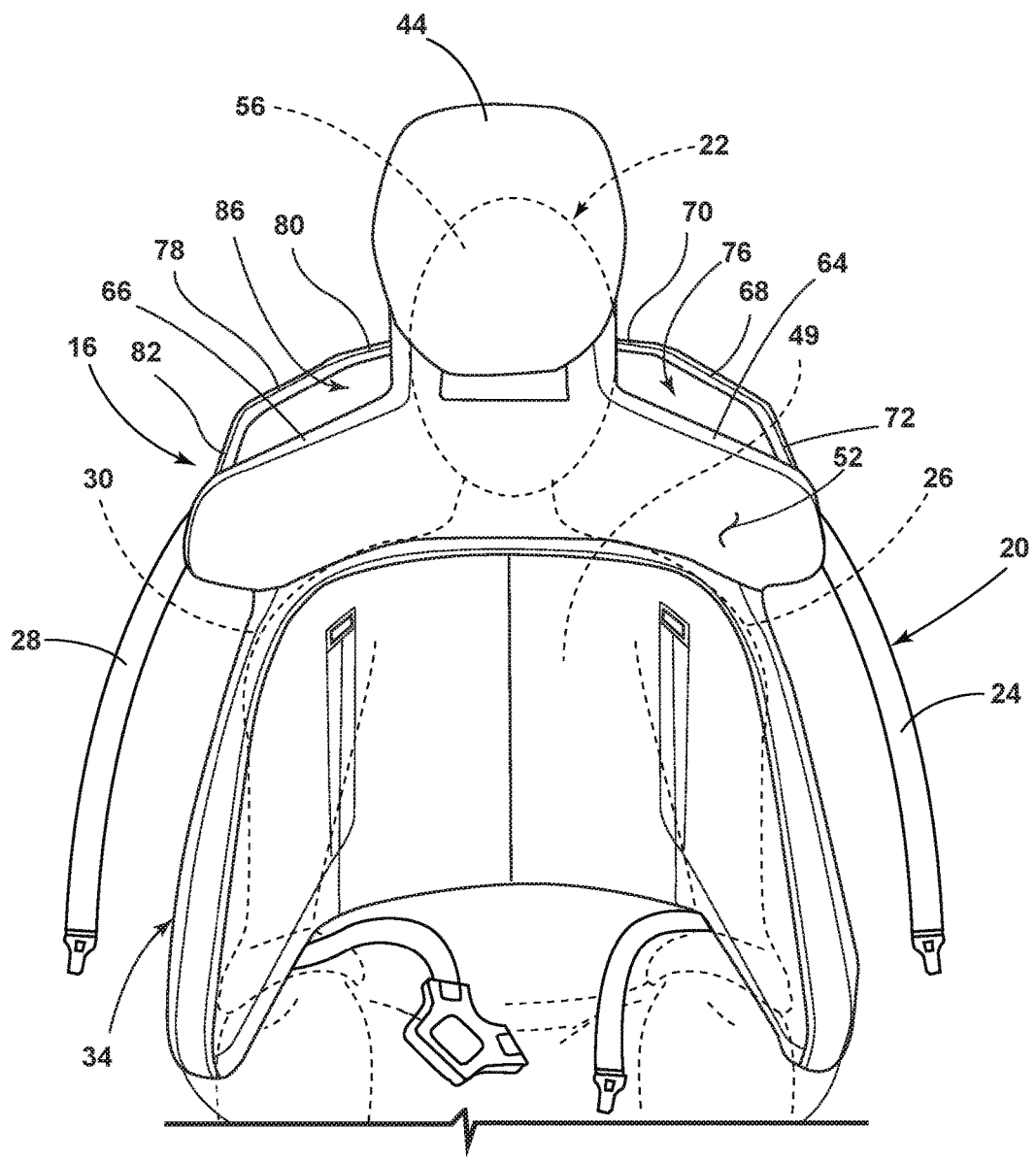
FIG. 9 is a front view of an occupant (in phantom) occupying the first seating assembly of FIG. 1 and the first seatbelt webbing retaining member and second seatbelt webbing retaining member are not retaining the first webbing section or a second webbing section, respectively.

Referring to FIG. 1, a vehicle 10 includes an interior 12 and a first row of seating 14 disposed in the interior 12, the first row of seating 14 including a first seating assembly 16 and a second seating assembly 18. The vehicle 10 further includes a seatbelt assembly 20, which could be a racing harness (of the four-point, five-point, or six-point varieties) or a typical three-point seatbelt. The seatbelt assembly 20 illustrated is a four-point racing harness. The seatbelt assembly 20 is configured to restrain an occupant 22 (see e.g., FIG. 9) of the first seating assembly 16. The seatbelt assembly 20 includes a first webbing section 24. The first webbing section 24 can be the section of the seatbelt assembly 20 configured to contact the outboard shoulder 26 (see again FIG. 9) of the occupant 22 of the first seating assembly 16. The illustrated embodiment of the seatbelt assembly 20 further includes a second webbing section 28. The second webbing section 28 can be the section of the seatbelt assembly 20 configured to contact the inboard shoulder 30 (see again FIG. 9) of the occupant 22 of the first seating assembly 16. While the four-point, five-point, and six-point racing harness type of seatbelt assemblies utilize the first webbing section 24 and the second webbing section 28, the typical three-point type of seatbelt assembly will utilize only the first webbing section 24. The first seating assembly 16 includes a seat 32 and a seatback 34, which can be pivotally coupled to or in a pivotal relationship with the seat 32.

Referring to FIGS. 2-7, the seatback 34 includes a midline 36, which can be vertical, dividing the seatback 34 into at least approximately symmetrical sides—a first side 38 and second side 40, which can be outboard and inboard sides, respectively. The seatback 34 includes a headrest 44, an upper back support section 46, and a primary back support section 48 below the upper back support section 46. The upper back support section 46 is the section of the seatback 34 that supports the upper back 49 (see FIG. 9) of the occupant 22. The upper back support section 46 is the uppermost part of the seatback 34 configured to support the occupant 22, excluding the headrest 44. The primary back support section 48 is the portion of the seatback 34 below the upper back support section 46. The upper back support section 46 includes a top portion 50, an occupant facing surface 52, and rearward facing surface 54 (see, e.g., FIG. 3). The occupant facing surface 52 generally faces forward and contacts the occupant 22 while the occupant 22 is occupying the first seating assembly 16. The rearward facing surface 54 generally faces rearward and does not contact the occupant 22 while the occupant 22 is occupying the first seating assembly 16. The headrest 44 is disposed above the top portion 50 of the upper back support section 46 and supports a head 56 (see FIG. 9) of the occupant 22 during use. In the illustrated embodiment, the seatback 34 further includes a headrest and webbing retainer support member 58, which is attached to the upper back support section 46 adjacent the rearward facing surface 54 of the upper back support section 46. The headrest and webbing retainer support member 58 is symmetrical about the midline 36. The headrest and webbing retainer support member 58 includes a headrest attachment portion 60, to which the headrest 44 is attached. The headrest attachment portion 60 takes the general shape of an upside-down U with several apertures 62 (see particularly FIGS. 5-8) through which fasteners (not illustrated) can be inserted to attach the headrest 44 to the headrest and webbing retainer support member 58.

The seatback 34 further includes a first upper seatbelt webbing contact portion 64, which is disposed to the first side 38 of the midline 36, and a second upper seatbelt webbing contact portion 66, which is disposed to the second side 40 of the midline 36. As discussed further below, the first upper seatbelt webbing contact portion 64 supports from beneath and contacts the first webbing section 24 of the seatbelt assembly 20, while the second upper seatbelt webbing contact portion 66 supports from beneath and contacts the second webbing section 28 of the seatbelt assembly 20, if included (such as with a four-point racing harness).

The seatback 34 further includes a first seatbelt webbing retaining member 68. As discussed further below, the first seatbelt webbing retaining member 68 retains the first webbing section 24 close to the seatback 34, such as the area of the seatback 34 where the outboard shoulder 26 of the occupant 22 would be when the occupant 22 is occupying the first seating assembly 16, when the seatbelt assembly 20 is not being used by the occupant 22. The first seatbelt webbing retaining member 68 has a medial end 70, a lateral end 72, and a middle portion 74. The lateral end 72 is further away from the midline 36 than the medial end 70. The middle portion 74 is disposed between the medial end 70 and the lateral end 72. In the illustrated embodiment, the medial end 70 of the first seatbelt webbing retaining member 68 is affixed, that is, attached to the seatback 34, while the lateral end 72 of the first seatbelt webbing retaining member 68 is releasably coupled to the seatback 34. However, it should be understood that the lateral end 72 of the first seatbelt webbing retaining member 68 could be attached to the seatback 34 while the medial end 70 is releasably coupled to the seatback 34, and the first seatbelt webbing retaining member 68 could perform the function of retaining the first webbing section 24 close to the seatback 34 when not being used by the occupant 22. The middle portion 74 of the first seatbelt webbing retaining member 68 is disposed above the first upper seatbelt webbing contact portion 64. When whichever of the lateral end 72 or medial end 70 is releasably coupled, the middle portion 74 forms a gap 76 above the first upper seatbelt webbing contact portion 64. As discussed further below, the first webbing section 24 can be retained in this gap 76, both when the occupant 22 is utilizing the seatbelt assembly 20 (see FIG. 14) and when the occupant 22 is no longer utilizing the seatbelt assembly 20 (see FIG. 15).

The seatback 34 further includes a second seatbelt webbing retaining member 78. As discussed further below, the second seatbelt webbing retaining member 78 retains the second webbing section 28 close to the seatback 34, such as the area of the seatback 34 where the inboard shoulder 30 of the occupant 22 would be when the occupant 22 is occupying the first seating assembly 16, when the seatbelt assembly 20 is not being used by the occupant 22. The second seatbelt webbing retaining member 78 has a medial end 80, a lateral end 82, and a middle portion 84. The lateral end 82 is further away from the midline 36 than the medial end 80. The middle portion 84 is disposed between the medial end 80 and the lateral end 82. In the illustrated embodiment, the medial end 80 of the second seatbelt webbing retaining member 78 is affixed, that is, attached to the seatback 34, while the lateral end 82 of the second seatbelt webbing retaining member 78 is releasably coupled to the seatback 34. However, it should be understood that the lateral end 82 of the second seatbelt webbing retaining member 78 could be attached to the seatback 34 while the medial end 80 is releasably coupled to the seatback 34, and the second seatbelt webbing retaining member 78 could perform the function of retaining the second webbing section 28 close to the seatback 34 when not being used by the occupant 22. The middle portion 84 of the second seatbelt webbing retaining member 78 is disposed above the second upper seatbelt webbing contact portion 66. When whichever of the lateral end 82 or medial end 80 is releasably coupled, the middle portion 84 forms a gap 86 above the second upper seatbelt webbing contact portion 66. As discussed further below, the second webbing section 28 is retained in this gap 86, both when the occupant 22 is utilizing the seatbelt assembly 20 (see again FIG. 14) and when the occupant 22 is no longer utilizing the seatbelt assembly 20 (see FIG. 15).

The seatback 34 further includes an extension portion 88 that elevates the headrest 44 above the upper back support section 46. In the illustrated embodiment, the extension portion 88 includes a first member 90, which is disposed to the first side 38 of the midline 36 of the seatback 34, and a second member 92, which is disposed to the second side 40 of the midline 36. In the illustrated embodiment, the extension portion 88 is part of the headrest and webbing retainer support member 58. The extension portion 88, specifically the first member 90 and the second member 92 thereof, thus extends toward the upper back support section 46 from the headrest attachment portion 60. The first member 90 and the second member 92 are contiguous with the headrest attachment portion 60. The first upper seatbelt webbing contact portion 64, which in this embodiment, is part of the headrest and webbing retainer support member 58, is contiguous with and extends laterally, sloping downward, from the first member 90 away from the midline 36. The second upper seatbelt webbing contact portion 66, which in this embodiment, is part of the headrest and webbing retainer support member 58, is contiguous with and extends laterally, sloping downward, from the second member 92 away from the midline 36.

In the illustrated embodiment of the seatback 34 wherein the medial ends 70, 80 are attached instead of the lateral ends 72, 82, the medial end 70 of the first seatbelt webbing retaining member 68 and the medial end 80 of the second seatbelt webbing retaining member 78 are attached to the extension portion 88. More specifically, in the illustrated embodiment, the medial end 70 of the first seatbelt webbing retaining member 68 is attached to the first member 90 of the extension portion 88. Similarly, the medial end 80 of the second seatbelt webbing retaining member 78 is attached to the second member 92 of the extension portion 88. The medial end 70 of the first seatbelt webbing retaining member 68 extends from the first member 90 of the extension portion 88 approximately parallel to the first upper seatbelt webbing contact portion 64 and approximately orthogonal to the first member 90. Likewise, the medial end 80 of the second seatbelt webbing retaining member 78 extends from the second member 92 of the extension portion 88 approximately parallel to the second upper seatbelt webbing contact portion 66 and approximately orthogonal to the second member 92.

Figure 2:
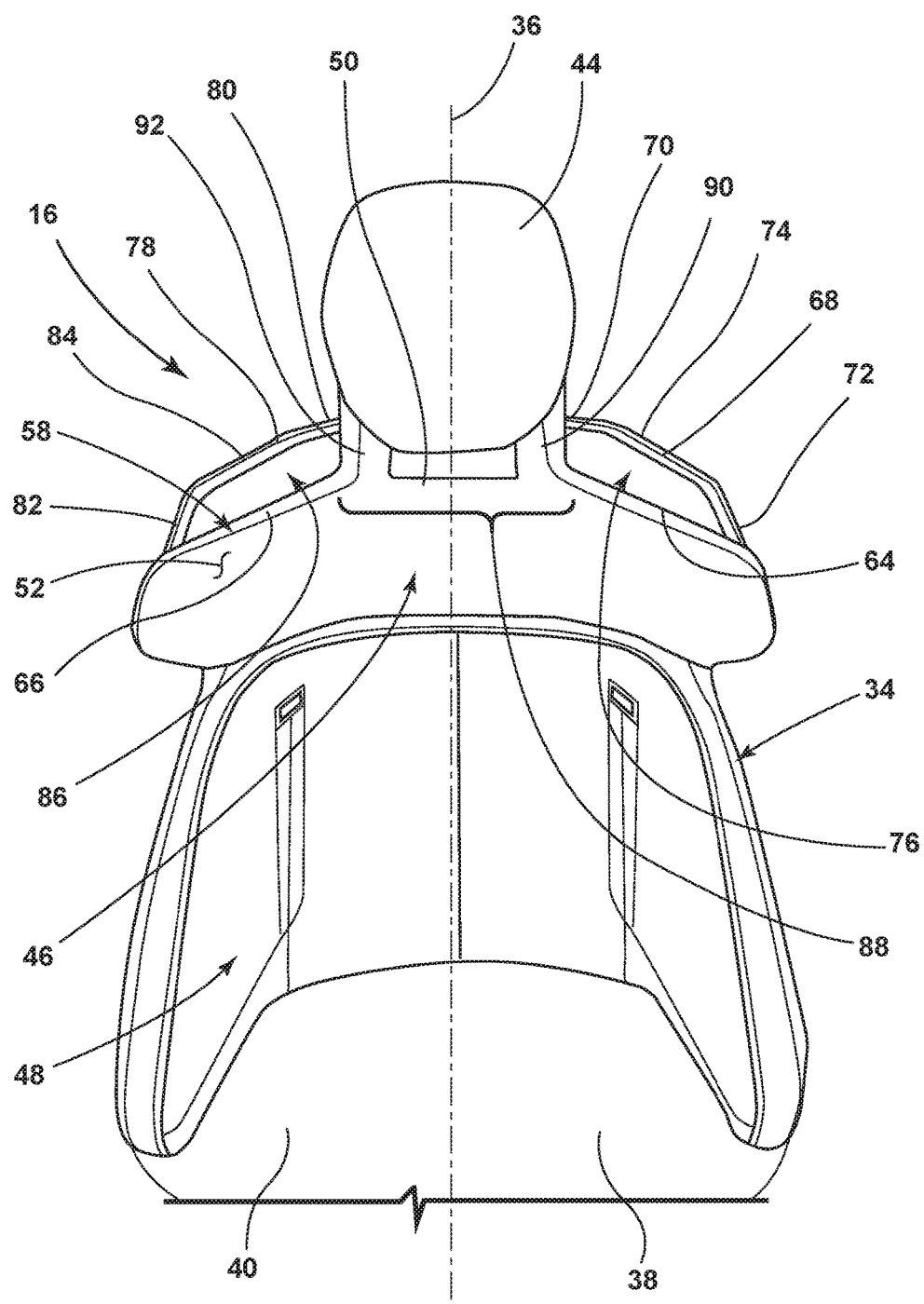
FIG. 2 is a front view of the first seating assembly of FIG. 1, illustrating a gap between a first seatbelt webbing retaining member and a first upper seatbelt webbing contact portion to retain a first webbing section of the seatbelt assembly.
Figure 3:
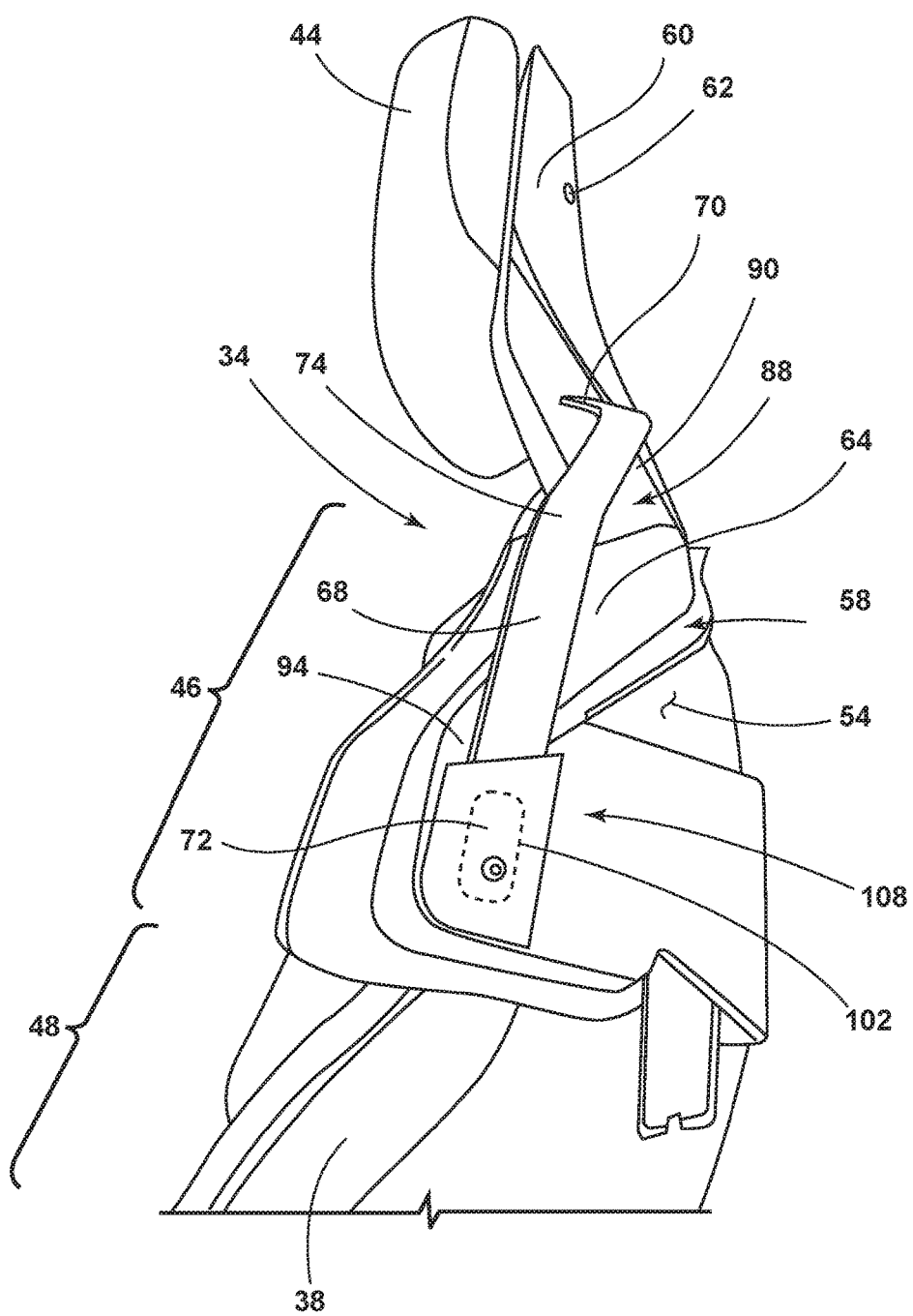
FIG. 3 is a side view of the first seating assembly of FIG. 1, illustrating a lateral end of the first seatbelt webbing retaining member in a coupled position relative to a first attachment section of the first upper seatbelt webbing contact portion.
Figure 4:
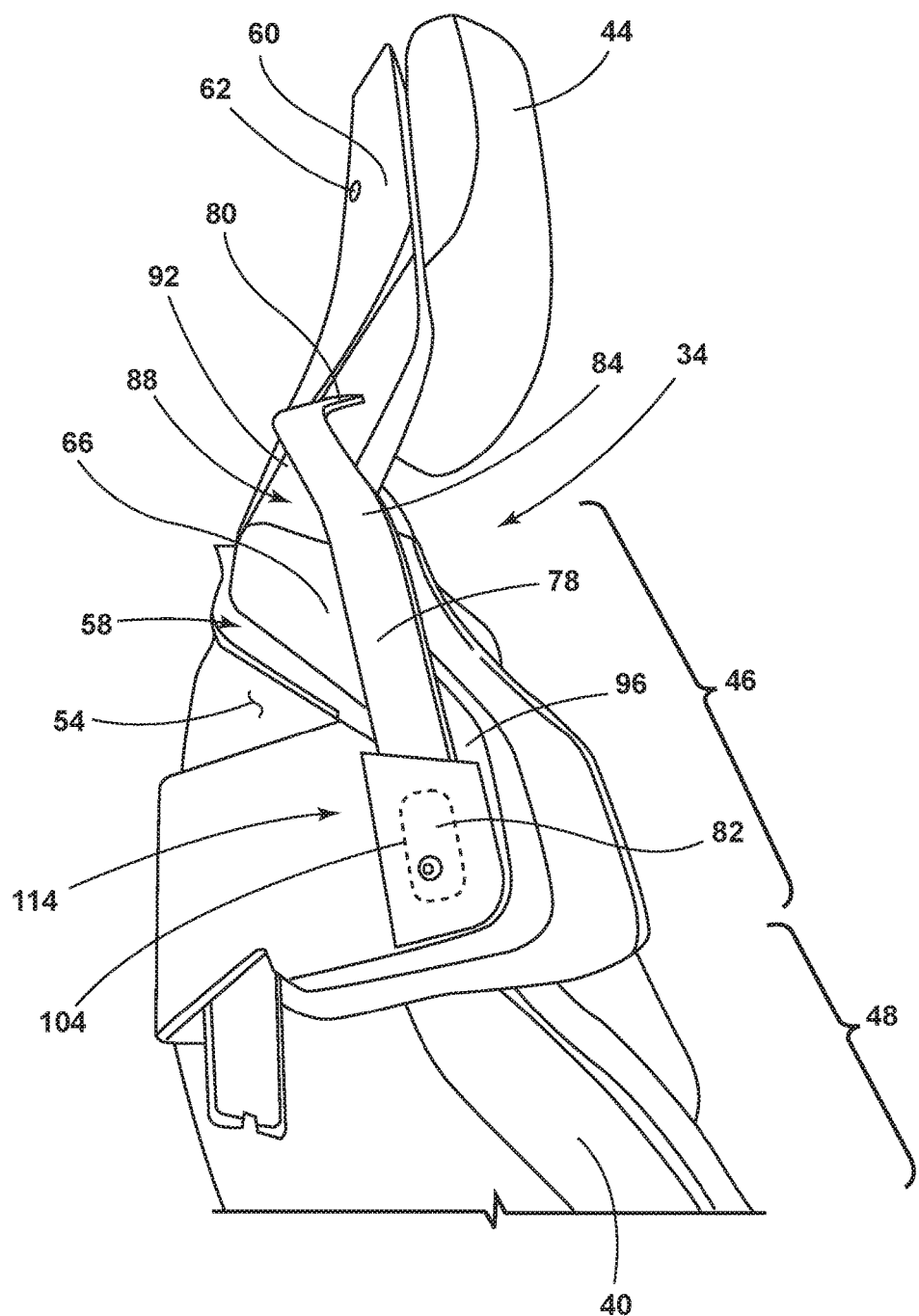
FIG. 4 is a side view of the first seating assembly of FIG. 1, illustrating a lateral end of a second seatbelt webbing retaining member in a coupled position relative to a second attachment section of a second upper seatbelt webbing contact portion.
Figure 5:
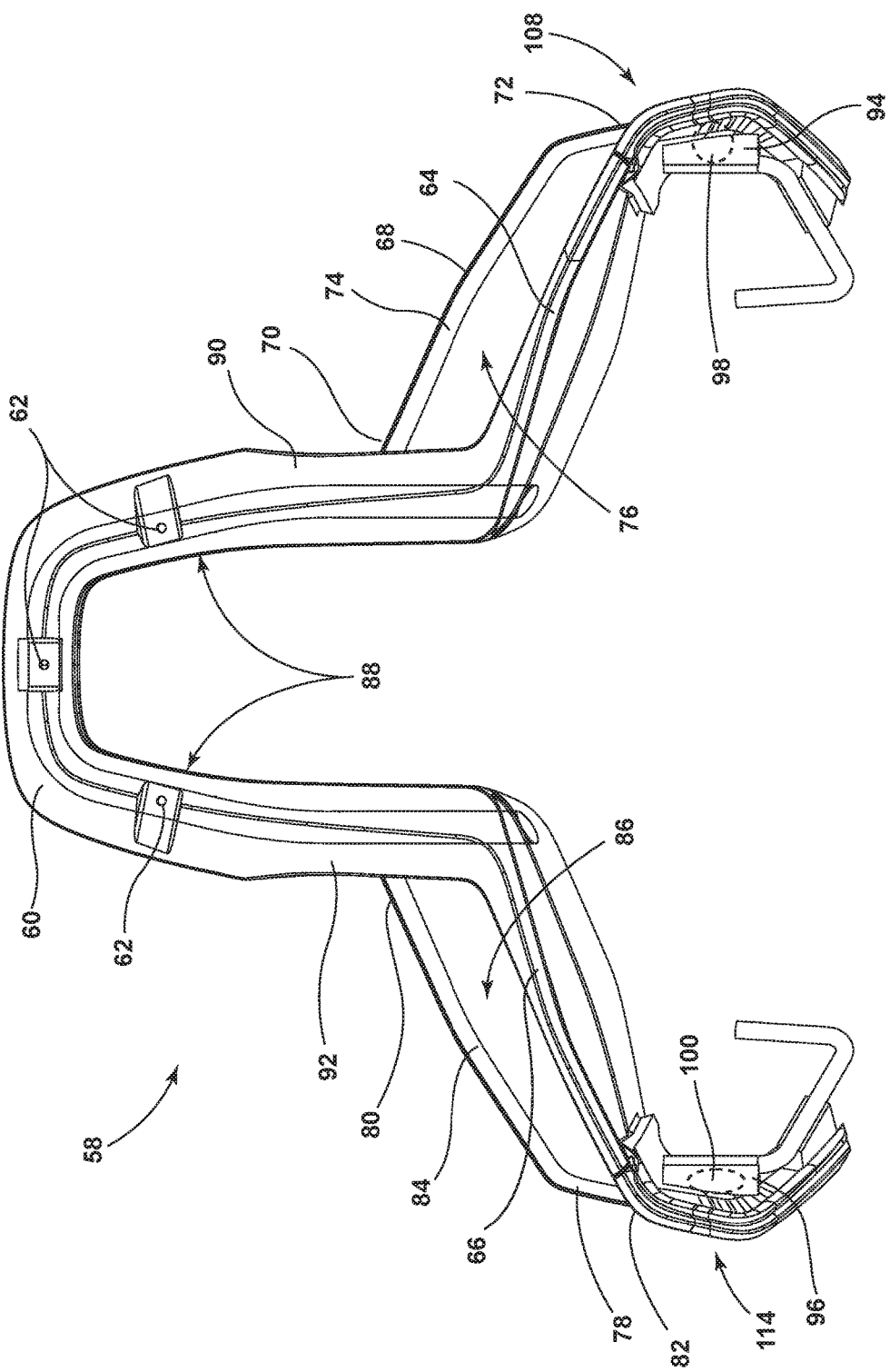
FIG. 5 is a front view of a headrest and webbing retainer support member utilized on the seatback of FIG. 1, illustrating an extension portion extending downward from a headrest attachment portion.
Figure 7:
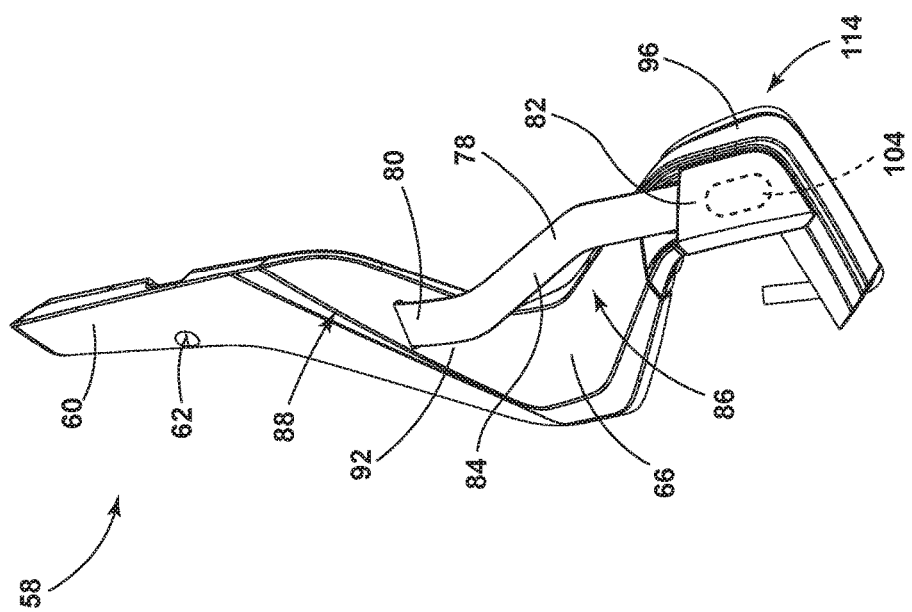
FIG. 7 is a side view of the headrest and webbing retainer support member of FIG. 5, illustrating the lateral end of the second seatbelt webbing retaining member having a metal piece.
Figure 6:
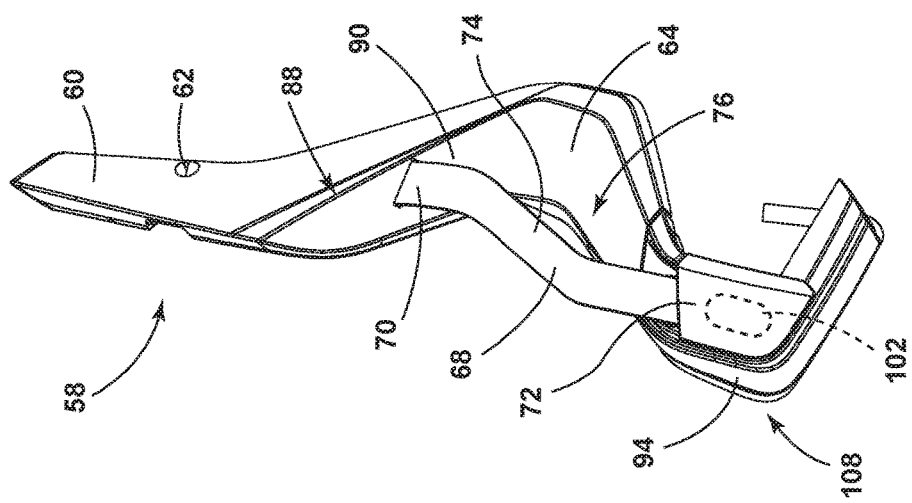
FIG. 6 is a side view of the headrest and webbing retainer support member of FIG. 5, illustrating the lateral end of the first seatbelt webbing retaining member having a metal piece.
Figure 8:
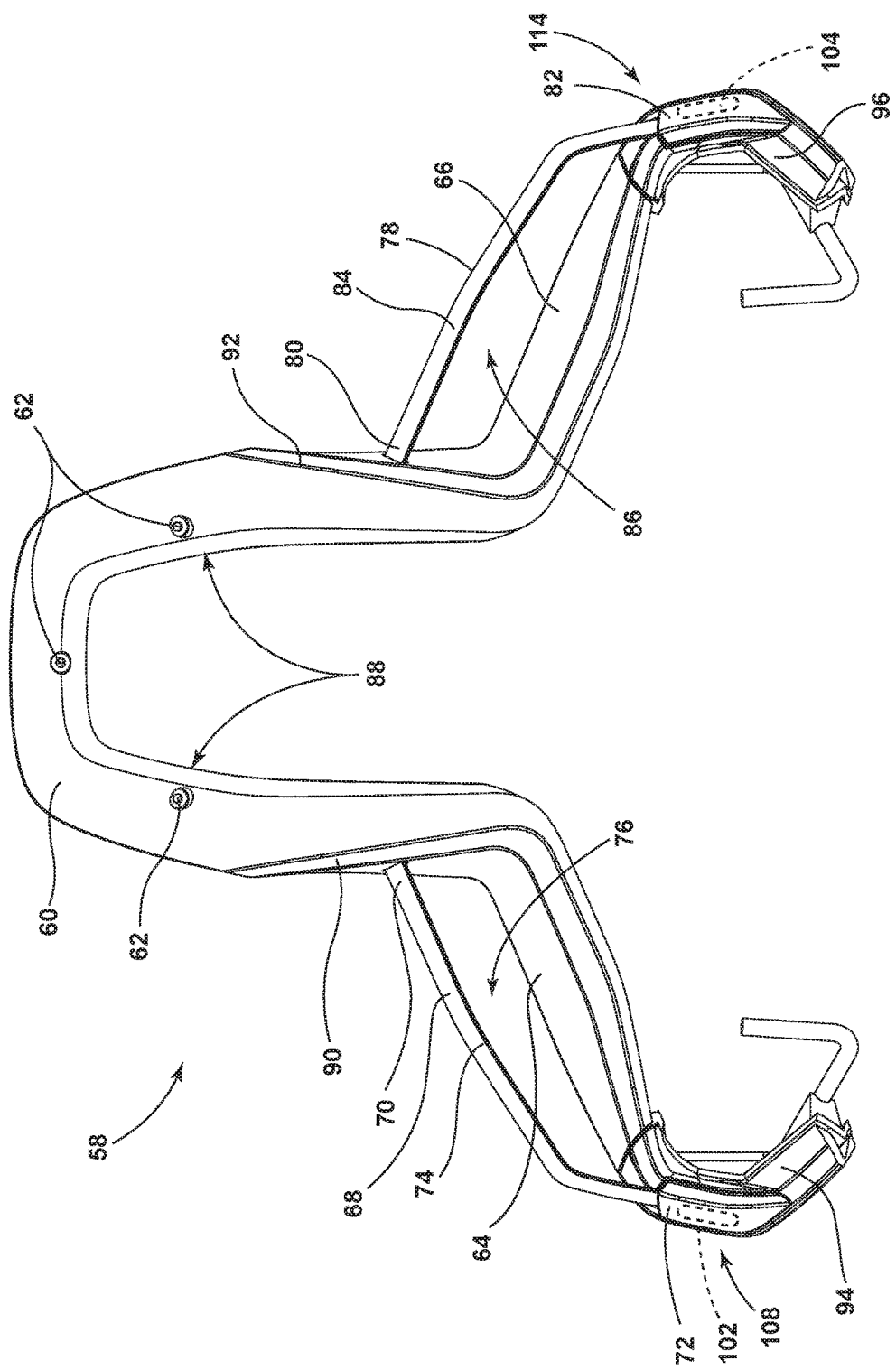
FIG. 8 is a rear view of the headrest and webbing retainer support member of FIG. 5, illustrating a first member and a second member of the extension portion.

As exemplified in comparing FIG. 2 (showing a front view of seatback 34) with FIGS. 3 and 4 (showing side views of the seatback 34), the lateral end 72 of the first seatbelt webbing retaining member 68 is releasably coupled rearward of the occupant facing surface 52 of the upper back support section 46. Likewise, the lateral end 82 of the second seatbelt webbing retaining member 78 is releasably coupled rearward of the occupant facing surface 52 of the upper back support section 46. More specifically, in the illustrated embodiment, the headrest and webbing retainer support member 58 includes a first attachment section 94 (see, e.g., FIG. 3) and a second attachment section 96 (see, e.g., FIG. 4). The first attachment section 94 extends generally downward from, and is contiguous with, the first upper seatbelt webbing contact portion 64. The second attachment section 96 extends generally downward from, and is contiguous with, the second upper seatbelt webbing contact portion 66. The lateral end 72 of the first seatbelt webbing retaining member 68 is releasably coupled to the first attachment section 94 of the headrest and webbing retainer support member 58. Likewise, the lateral end 82 of the second seatbelt webbing retaining member 78 is releasably coupled to the second attachment section 96 of the headrest and webbing retainer support member 58.

The first seatbelt webbing retaining member 68 and the second seatbelt webbing retaining member 78 can be releasably coupled in any number of ways, including without limitation, via snaps, buttons, belts, and clips. In a preferred way, the first seatbelt webbing retaining member 68 and the second seatbelt webbing retaining member 78 are releasably coupled to the first attachment section 94 and the second attachment section 96, respectively, through magnetic attraction. In the illustrated embodiment, the first attachment section 94 includes a magnet 98, which can be molded into the first attachment section 94 (see particularly FIG. 5). Likewise, the second attachment section 96 includes a magnet 100, which can be molded into second attachment section 96. The lateral end 72 of the first seatbelt webbing retaining member 68 includes a metal piece 102 positioned to magnetically cooperate with the magnet 98. Likewise, the lateral end 82 of the second seatbelt webbing retaining member 78 includes a metal piece 104 positioned to magnetically cooperate with the magnet 100. The lateral end 72 of the first seatbelt webbing retaining member 68 is releasably coupled to the first attachment section 94 through magnetic attraction because the metal piece 102 of the lateral end 72 of the first seatbelt webbing retaining member 68 is magnetically attracted to the magnet 98 of the first attachment section 94, and the magnetic attraction can be overcome with force provided by the occupant 22, as discussed further below. The lateral end 82 of the second seatbelt webbing retaining member 78 is releasably coupled to the second attachment section 96 through magnetic attraction because the metal piece 104 of the lateral end 82 of the second seatbelt webbing retaining member 78 is magnetically attracted to the magnet 100 of the second attachment section 96, and the magnetic attraction can be overcome with force provided by the occupant 22, as discussed further below.

The lateral end 72 of the first seatbelt webbing retaining member 68 can be positioned approximately vertically, as illustrated, or vertically when releasably coupled. Likewise, the lateral end 82 of the second seatbelt webbing retaining member 78 can be positioned approximately vertically, as illustrated, or vertically when releasably coupled. Both the first seatbelt webbing retaining member 68 and the second seatbelt webbing retaining member 78 can be fabricated from a rigid yet flexible strip of material such as a 2 mm thick strip of ABS or nylon that is covered by a fabric or leather. The second seating assembly 18 can be identical to the first seating assembly 16 described above.

Referring now to FIGS. 9-14, the first seating assembly 16 described above can be utilized in a novel method of utilizing the seatbelt assembly 20 with the first seating assembly 16 in the vehicle 10. The method includes presenting the vehicle 10 with the first seating assembly 16 and the seatbelt assembly 20 as described above. When the occupant 22 enters the interior 12 of the vehicle 10, or when the occupant 22 has just installed the seatbelt assembly 20, the first seatbelt webbing retaining member 68 may not be retaining the first webbing section 24 of the seatbelt assembly 20 in the gap 76. Rather, the first webbing section 24 could be inconveniently located near a floor 106 (see FIG. 1) of the vehicle 10 or rearward of the seatback 34. Such is the scenario illustrated in FIG. 9.

Figure 10:
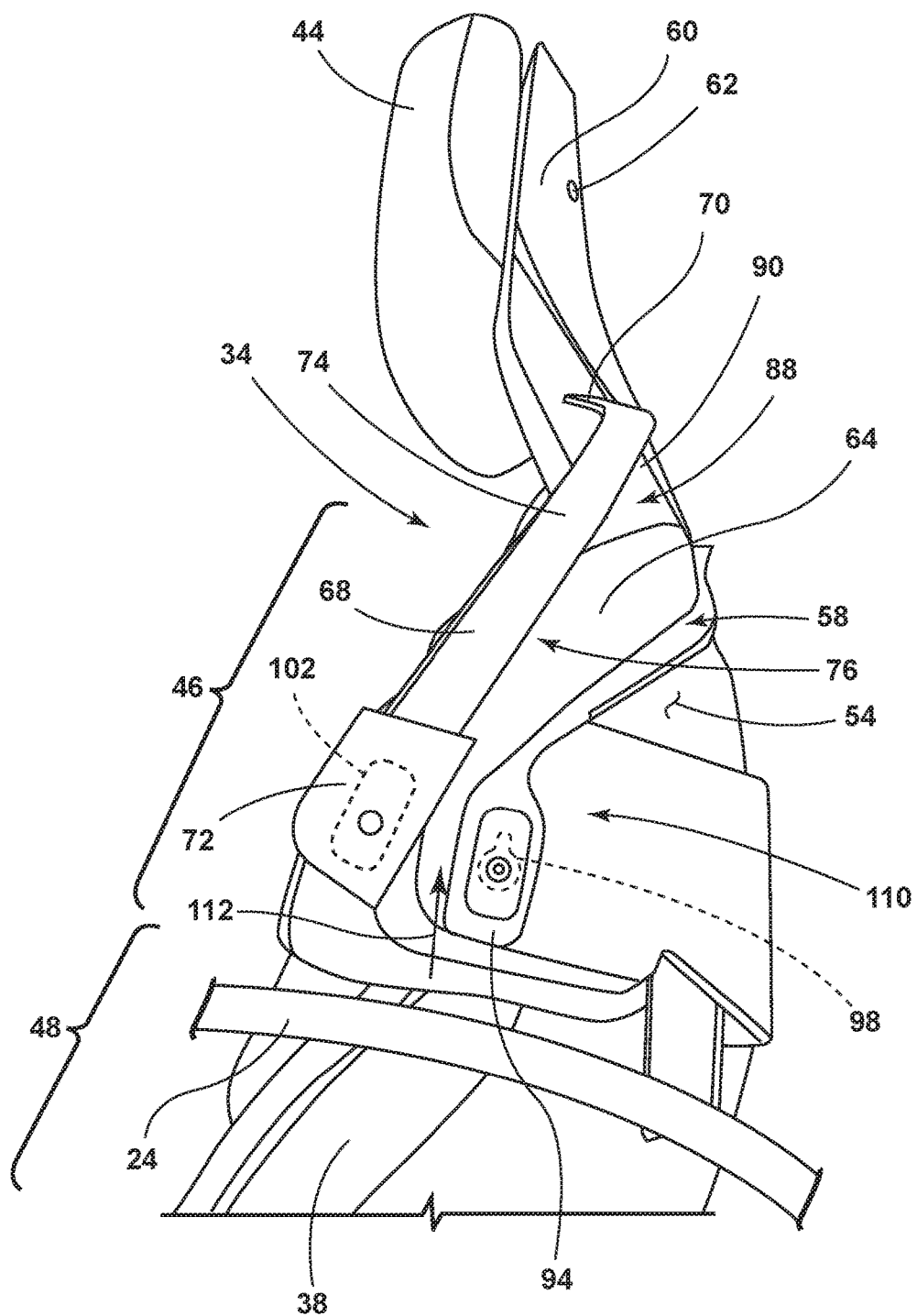
FIG. 10 is a side view of the seatback of FIG. 1, illustrating the first seatbelt webbing retaining member in a released position and the first webbing section is moving in a direction into the gap under the first seatbelt webbing retaining member.
Figure 11:
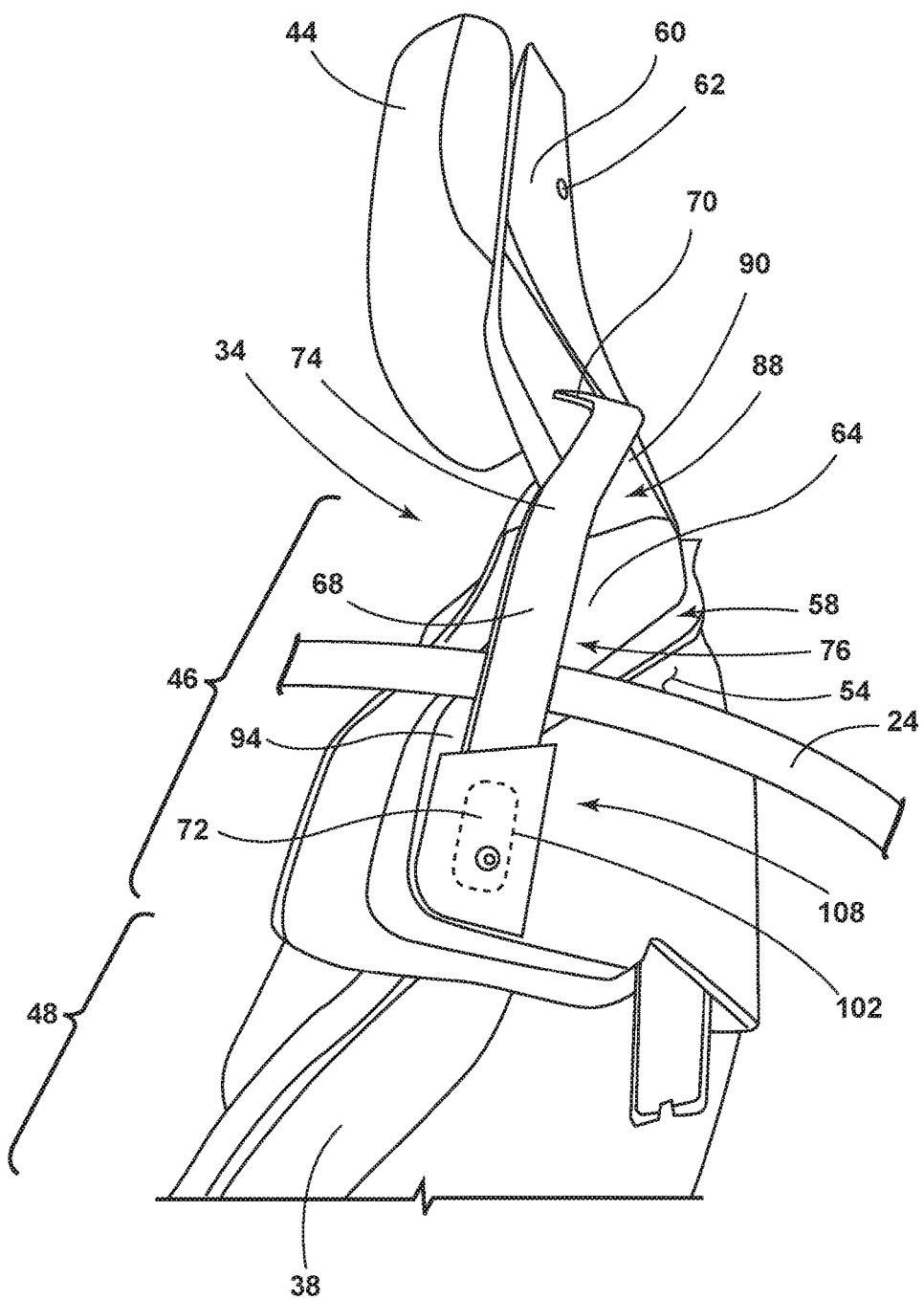
FIG. 11 is a side view of the seatback of FIG. 1, illustrating the first webbing section in the gap retained between the first seatbelt webbing retaining member, again in the coupled position, and the first upper seatbelt webbing contact portion.

The method further includes releasing the releasably coupled medial end 70 or lateral end 72 of the first seatbelt webbing retaining member 68, whichever of the medial end 70 or lateral end 72 is releasably coupled and not affixed. If the lateral end 72 of the first seatbelt webbing retaining member 68 is releasably coupled, then that method step would consist of releasing the releasably coupled lateral end 72 of the first seatbelt webbing retaining member 68. For example, in the illustrated embodiment (see particularly FIG. 3), the lateral end 72 of the first seatbelt webbing retaining member 68 is releasably coupled to the first attachment section 94 and is thus in a coupled position 108. The occupant 22 can then lift upward on the first seatbelt webbing retaining member 68 (or apply some other force) eventually overcoming the magnetic attraction releasably coupling the metal piece 102 of the lateral end 72 to the magnet 98 of the first attachment section 94 and thereby release the releasably coupled lateral end 72 to a released position 110, as illustrated in FIG. 10.

The method further includes placing the first webbing section 24 of the seatbelt assembly 20 between the first upper seatbelt webbing contact portion 64 and the first seatbelt webbing retaining member 68. The first webbing section 24 now contacts the first upper seatbelt webbing contact portion 64. More particularly, the first webbing section 24 is moved in direction 112 between the lateral end 72 of the first seatbelt webbing retaining member 68 and the first attachment section 94 and into the gap 76 between the first seatbelt webbing retaining member 68 and the first upper seatbelt webbing contact portion 64. The first webbing section 24 is placed laterally of the extension portion 88, specifically the first member 90 thereof, in the direction away from the midline 36.

The method further includes recoupling the releasably coupled medial end 70 or lateral end 72 of the first seatbelt webbing retaining member 68 that was previously released. If the lateral end 72 of the first seatbelt webbing retaining member 68 is releasably coupled, then that method step would consist of recoupling the lateral end 72 of the first seatbelt webbing retaining member 68. For example, with the illustrated embodiment, the lateral end 72 of the first seatbelt webbing retaining member 68 is recoupled to the first attachment section 94 and is again in the releasably coupled position 108. The first webbing section 24 of the seatbelt assembly 20 is now retained in the gap 76 and cannot drop to the floor 106 of the vehicle 10 (see particularly, FIG. 11). The first webbing section 24 remains in a convenient location hung on the first seating assembly 16, even when the occupant 22 is not utilizing the seatbelt assembly 20.

Figure 12:
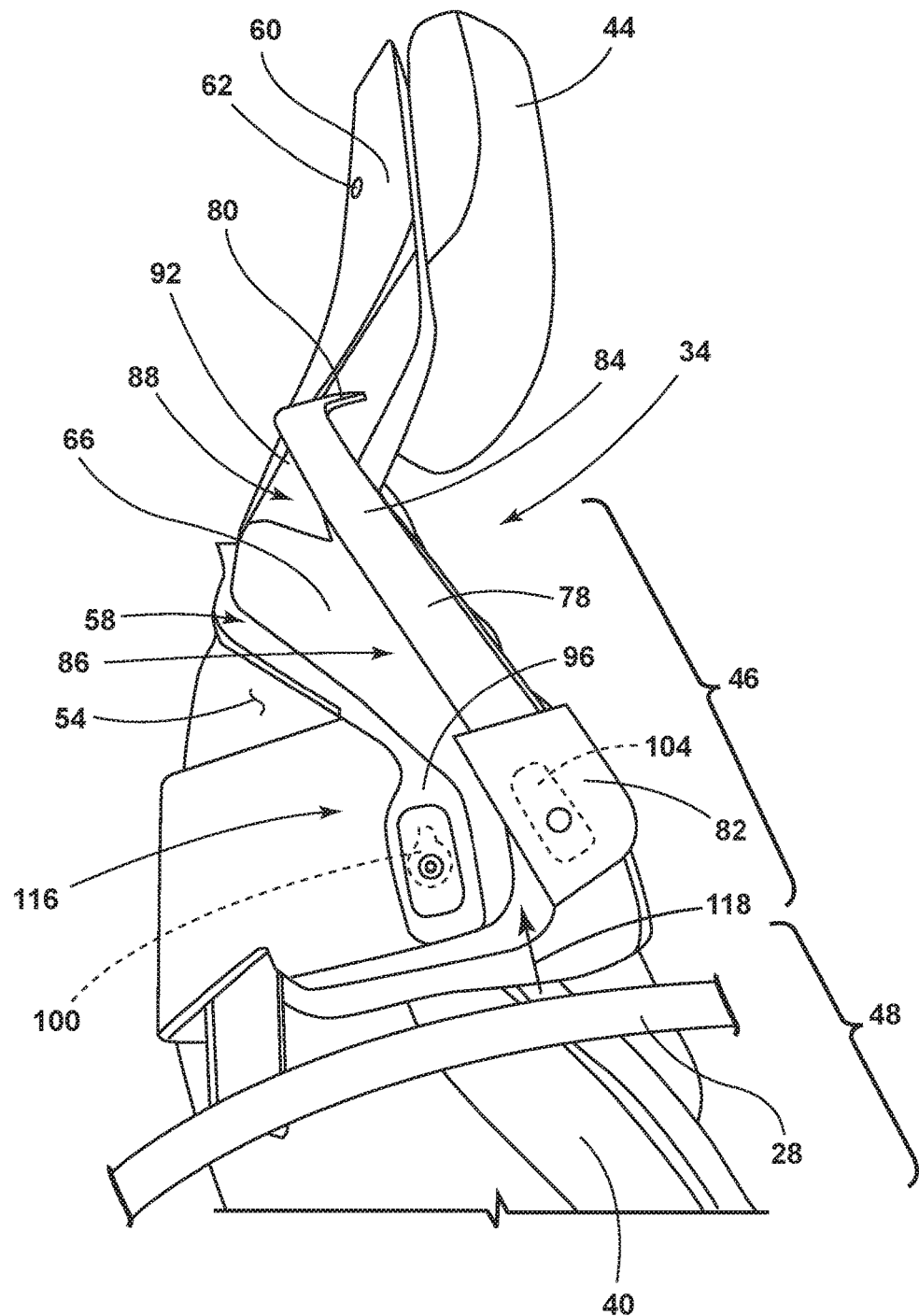
FIG. 12 is a side view of the seatback of FIG. 1, illustrating the second seatbelt webbing retaining member in a released position and the second webbing section is moving in a direction into the gap under the second seatbelt webbing retaining member.
Figure 13:
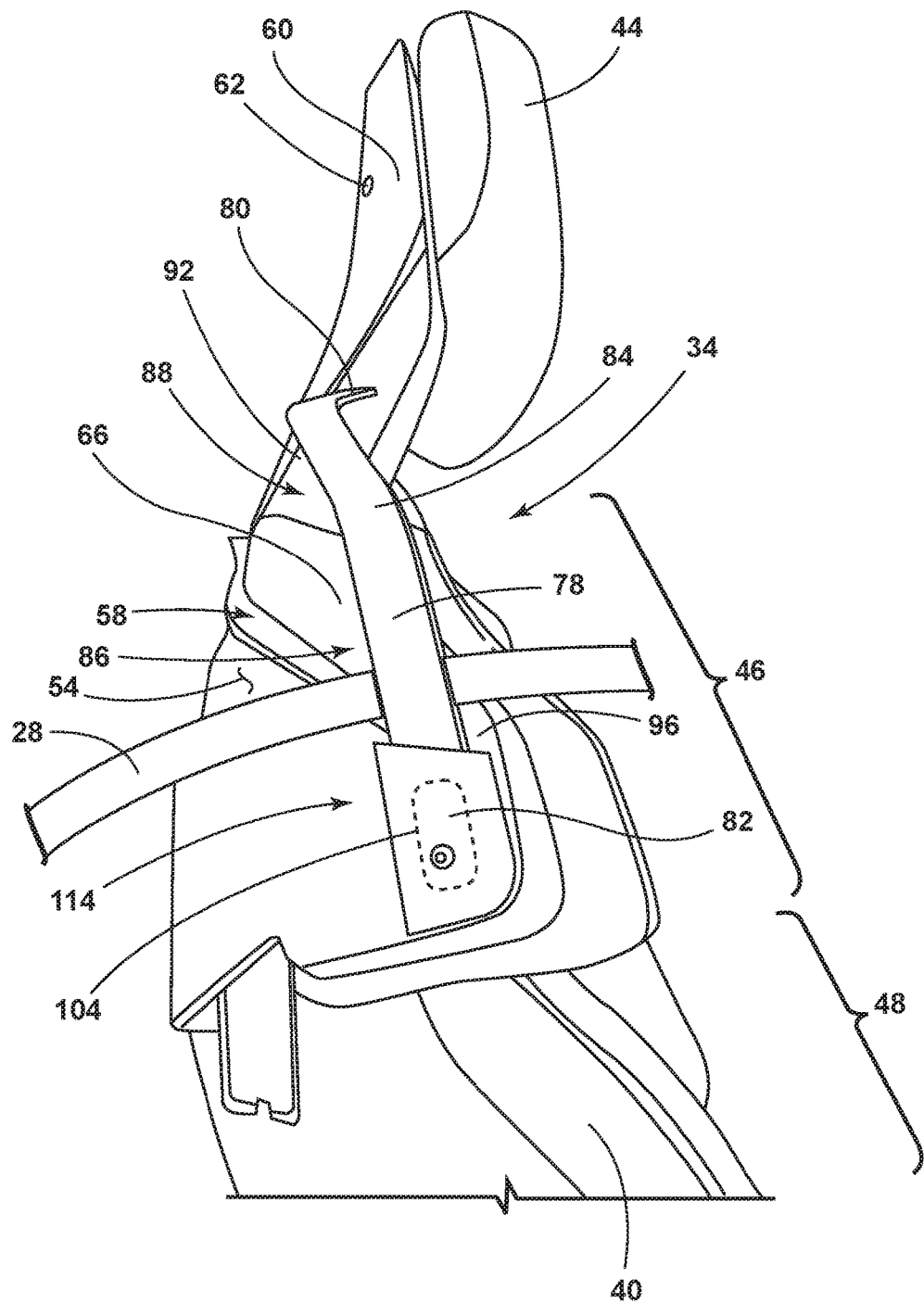
FIG. 13 is a side view of the seatback of FIG. 1, illustrating the second webbing section in the gap retained between the second seatbelt webbing retaining member, again in the coupled position, and the second upper seatbelt webbing contact portion.

In the event the vehicle 10 incorporates a second webbing section 28 and a second seatbelt webbing retaining member 78, the method can further include releasing the releasably coupled medial end 80 or lateral end 82 of the second seatbelt webbing retaining member 78, whichever of the medial end 80 or the lateral end 82 is releasable coupled and not affixed. If the lateral end 82 of the second seatbelt webbing retaining member 78 is releasably coupled, then that method step would consist of releasing the releasably coupled lateral end 82 of the second seatbelt webbing retaining member 78. For example, in the illustrated embodiment (see particularly FIG. 4), the lateral end 82 of the second seatbelt webbing retaining member 78 is releasably coupled to the second attachment section 96 and is thus in a coupled position 114. The occupant 22 can then lift upward on the second seatbelt webbing retaining member 78 (or apply some other force) eventually overcoming the magnetic attraction releasably coupling the metal piece 104 of the lateral end 82 to the magnet 100 of the second attachment section 96 and thereby release the releasably coupled lateral end 82 to a released position 116, as illustrated in FIG. 12.

The method further includes placing the second webbing section 28 of the seatbelt assembly 20 between the second upper seatbelt webbing contact portion 66 and the second seatbelt webbing retaining member 78. The second webbing section 28 now contacts the second upper seatbelt webbing contact portion 66. More particularly, the second webbing section 28 is moved in direction 118 between the lateral end 82 of the second seatbelt webbing retaining member 78 and the second attachment section 96 and into the gap 86 between the second seatbelt webbing retaining member 78 and second upper seatbelt webbing contact portion 66. The second webbing section 28 is placed laterally of the extension portion 88, specifically the second member 92 thereof, in the direction away from the midline 36.

The method further includes recoupling the releasably coupled medial end 80 or lateral end 82 of the second seatbelt webbing retaining member 78 that was previously released. If the lateral end 82 of the second seatbelt webbing retaining member 78 is releasably coupled, then that method step would consist of recoupling the lateral end 82 of the second seatbelt webbing retaining member 78. For example, with the illustrated embodiment, the lateral end 82 of the second seatbelt webbing retaining member 78 is recoupled to the second attachment section 96 and is again in the releasably coupled position 114. The second webbing section 28 of the seatbelt assembly 20 is now retained in the gap 86 and cannot drop to the floor 106 of the vehicle 10 (see particularly, FIG. 13). The second webbing section 28 remains in a convenient location hung on the first seating assembly 16, even when the occupant 22 is not utilizing the seatbelt assembly 20.

Figure 14:
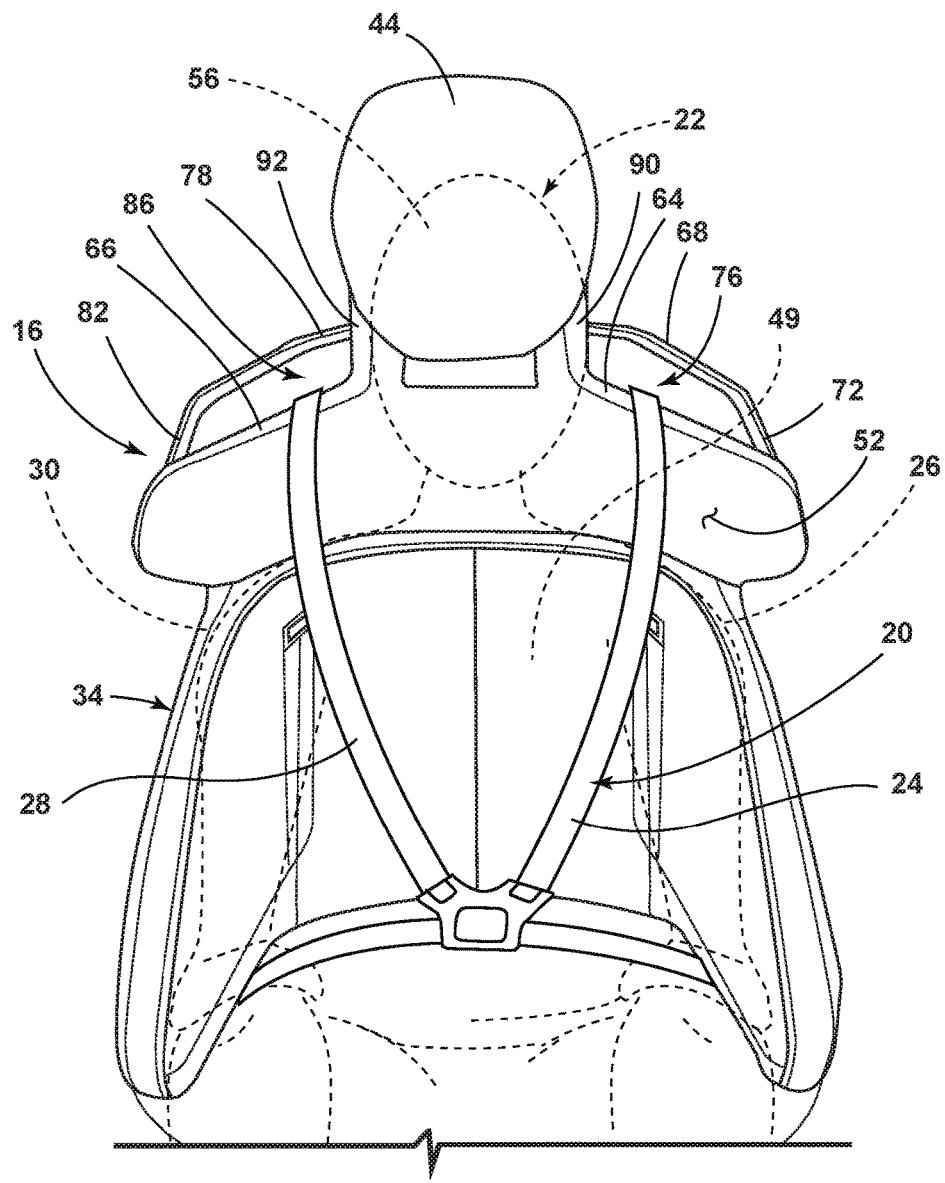
FIG. 14 is a front view of the occupant (in phantom) occupying the first seating assembly of FIG. 1 and the first seatbelt webbing retaining member and the second seatbelt webbing retaining member are retaining the first webbing section and second webbing section, respectively.

The method can further comprise securing the seatbelt assembly 20 over the occupant 22 of the first seating assembly 16. As illustrated in FIG. 14, the occupant 22 is occupying the first seating assembly 16. The seatbelt assembly 20 is securing the occupant 22 in the first seating assembly 16. The first webbing section 24 and the second webbing section 28 are retained to the seatback 34 within the gap 76 and gap 86, respectively.

The method can further comprise positioning the first webbing section 24 on the first upper seatbelt webbing contact portion 64 to accommodate the height of the occupant 22. The method can further comprise positioning the second webbing section 28 on the second upper seatbelt webbing contact portion 66 to accommodate the height of the occupant 22. Traditional seatbelt webbing pass-throughs are holes through the seatback and have a small width and, thus cannot properly fit very short or very tall occupants. However, because the first webbing section 24 can be positioned on the downwardly sloping first upper seatbelt webbing contact portion 64 anywhere between the first member 90 of the extension portion 88 and where the lateral end 72 of the first seatbelt webbing retaining member 68 is releasably coupled to the first attachment section 94, the first webbing section 24 can be positioned to accommodate the height of any occupant 22. The same principle of course applies to the second webbing section 28.

Figure 15:
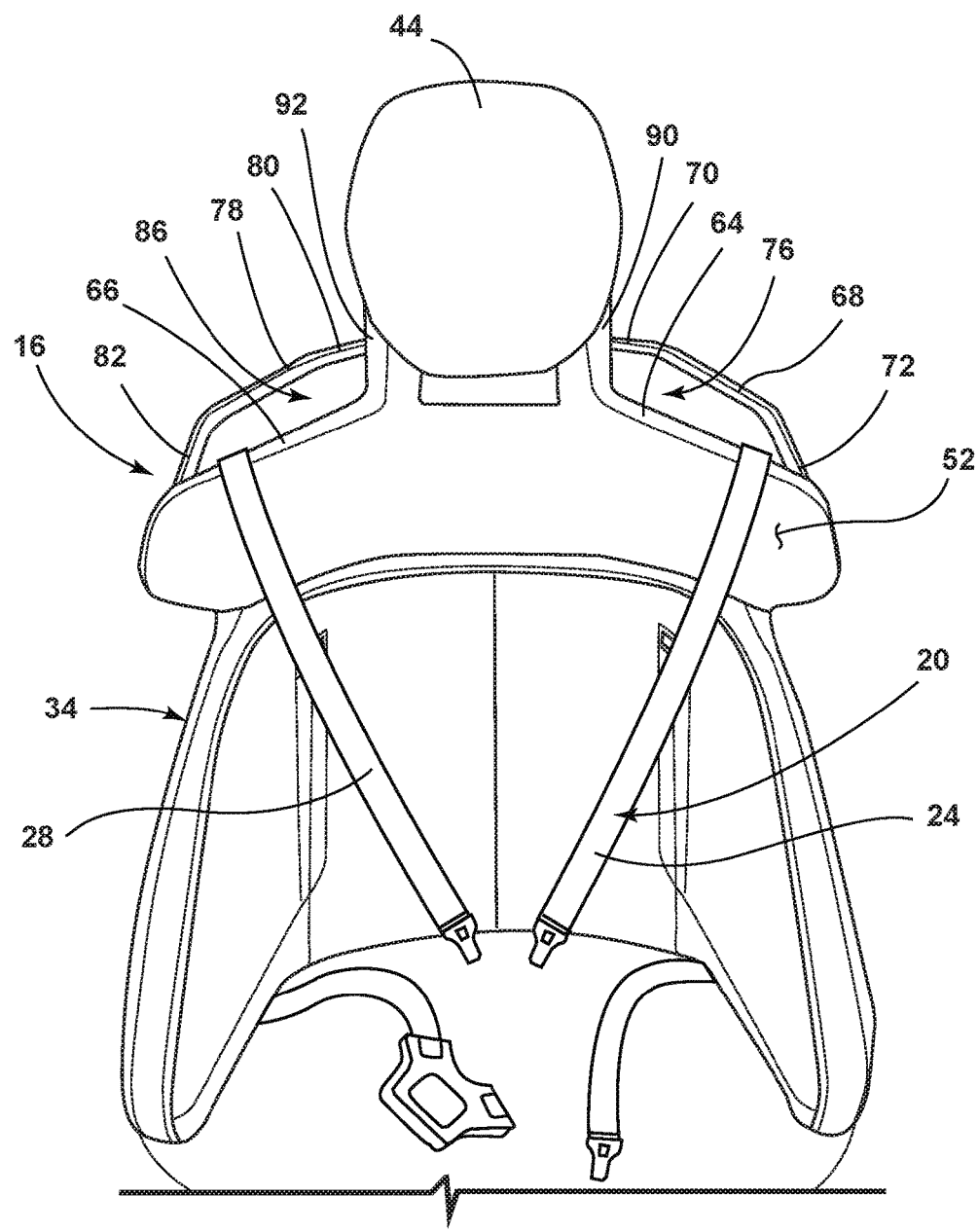
FIG. 15 is a front view the first seating assembly of FIG. 1, without the occupant, and the first seatbelt webbing retaining member and the second seatbelt webbing retaining member are still retaining the first webbing section and second webbing section, respectively.

Referring now to FIG. 15, when the occupant 22 no longer needs to use the seatbelt assembly 20 and exits the first seating assembly 16, the first webbing section 24 and the second webbing section 28 nevertheless remain retained over the first upper seatbelt webbing contact portion 64 and the second upper seatbelt webbing contact portion 66, respectively, conveniently located for the next use of the seatbelt assembly 20 by the occupant 22. The lateral end 72 of the first seatbelt webbing retaining member 68 being in the coupled position 108 prevents the first webbing section 24 from leaving the gap 76 and dropping toward the floor 106. Likewise, the lateral end 82 of the second seatbelt webbing retaining member 78 being in the coupled position 114 prevents the second webbing section 28 from leaving the gap 86 and dropping toward the floor 106.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seatback for a vehicle comprising:
   a midline;
   an upper back support section configured to support the upper back of an occupant, the upper back support section having a rearward facing surface;
   a headrest and webbing retainer support member attached adjacent to the rearward facing surface of the upper back support section, the headrest and webbing retainer support member including:
      a headrest attachment portion;
      an extension portion extending between the upper back support section and the headrest attachment portion;
      a first upper seatbelt webbing contact portion disposed to a first side of the midline, and extending laterally and downward from the extension portion,
      a first attachment section extending downward from the first upper seatbelt webbing contact portion;
      a first seatbelt webbing retaining member disposed to a first side of the midline, the first seatbelt webbing retaining member having a medial end, a lateral end further away from the midline than the medial end, and a middle portion between the medial end and the lateral end,
   a headrest attached to the headrest attachment portion of the headrest and webbing retainer support member, the extension portion elevating the headrest above the upper back support section;
   wherein, the medial end of the first seatbelt webbing retaining member is affixed and the lateral end is releasably coupled to the first attachment section of the headrest and webbing retainer support member; and
   wherein, the middle portion is disposed above the first upper seatbelt webbing contact portion forming a gap configured to retain a first webbing section of a seatbelt assembly.

2. The seatback of claim 1:
   the headrest and webbing retainer support member further including:
      a second upper seatbelt webbing contact portion disposed to a second side of the midline, and extending laterally and downward from the extension portion;
      a second attachment section extending downward from the second upper seatbelt webbing contact portion; and a second seatbelt webbing retaining member disposed to a second side of the midline, the second seatbelt webbing retaining member having a medial end, a lateral end further away from the midline than the medial end, and a middle portion between the medial end and the lateral end;

wherein, the medial end of the second seatbelt webbing retaining member is affixed and the lateral end is releasably coupled to the second attachment section of the headrest and webbing retainer support member; and wherein, the middle portion of the second seatbelt webbing retaining member is disposed above the second upper seatbelt webbing contact portion forming a gap configured to retain a second upper seatbelt webbing.

3. The seatback of claim 2:

the upper back support section including a top portion; and the headrest is disposed above the top portion of the upper back support section;

wherein, the medial end of the first seatbelt webbing retaining member and the medial end of the second seatbelt webbing retaining member are affixed to the extension portion.

4. The seatback of claim 2, the extension portion comprising a first member and a second member;

wherein, the medial end of the first seatbelt webbing retaining member is affixed to the first member of the extension portion; and wherein, the medial end of the second seatbelt webbing retaining member is affixed to the second member of the extension portion.

5. The seatback of claim 4, wherein, the medial end of the first seatbelt webbing retaining member extends from the first member of the extension portion approximately parallel to the first upper seatbelt webbing contact portion;

wherein, the medial end of the second seatbelt webbing retaining member extends from the second member of the extension portion approximately parallel to the second upper seatbelt webbing contact portion;

wherein, the lateral end of the first seatbelt webbing retaining member is positioned vertically or approximately vertically when releasably coupled; and wherein, the lateral end of the second seatbelt webbing retaining member is positioned vertically or approximately vertically when releasably coupled.

6. The seatback of claim 2, wherein, the lateral end of the first seatbelt webbing retaining member is releasably coupled through magnetic attraction; and wherein, the lateral end of the second seatbelt webbing retaining member is releasably coupled through magnetic attraction.

7. The seatback of claim 6, the first attachment section including a magnet;

the second attachment section including a magnet;

the lateral end of the first seatbelt webbing retaining member including a metal piece; and the lateral end of the second seatbelt webbing retaining member including a metal piece;

wherein, the lateral end of the first seatbelt webbing retaining member is releasably coupled to the first attachment section because the metal piece of the lateral end of the first seatbelt webbing retaining member is magnetically attracted to the magnet of the first attachment section; and wherein, the lateral end of the second seatbelt webbing retaining member is releasably coupled to the second attachment section because the metal piece of the lateral end of the second seatbelt webbing retaining member is magnetically attracted to the magnet of the second attachment section.

8. The seatback of claim 2, the upper back support section including an occupant facing surface;

wherein, the lateral end of the first seatbelt webbing retaining member is releasably coupled rearward of the occupant facing surface of the upper back support section; and wherein, the lateral end of the second seatbelt webbing retaining member is releasably coupled rearward of the occupant facing surface of the upper back support section.

9. The seatback of claim 2:

wherein, the headrest and webbing retainer support member is symmetrical about the midline.

10. A method of utilizing a seatbelt assembly with a seating assembly in a vehicle comprising:

presenting a vehicle comprising:

a seating assembly including a seatback comprising:

a midline;

an upper back support section configured to support the upper back of an occupant, the upper back support section having a rearward facing surface;

a headrest and webbing retainer support member attached adjacent to the rearward facing surface of the upper back support section, the headrest and webbing retainer support member including:

a headrest attachment portion;

an extension portion extending between the upper back support section and the headrest attachment portion;

a first upper seatbelt webbing contact portion disposed to a first side of the midline and extending laterally and downward from the extension portion;

a first attachment section extending downward from the first upper seatbelt webbing contact portion; and a first seatbelt webbing retaining member disposed to the first side of the midline, the first seatbelt webbing retaining member having a medial end, a lateral end further away from the midline than the medial end, and a middle portion between the medial end and the lateral end;

a headrest attached to the headrest attachment portion of the headrest and webbing retainer support member, the extension portion elevating the headrest above the upper back support section;

wherein, the medial end of the first seatbelt webbing retaining member is affixed and the lateral end is releasably coupled to the first attachment section of the headrest and webbing retainer support member; and wherein, the middle portion is disposed above the first upper seatbelt webbing contact portion forming a gap configured to retain a first upper seatbelt webbing;

a seatbelt assembly with a first webbing section configured to restrain an occupant of the seating assembly;

releasing the releasably coupled lateral end of the first seatbelt webbing retaining member;

placing the first webbing section of the seatbelt assembly between the first upper seatbelt webbing contact portion and the first seatbelt webbing retaining member so that the first webbing section contacts the first upper seatbelt webbing contact portion; and recoupling the releasably coupled lateral end of the first seatbelt webbing retaining member that was previously released.

11. The method of claim 10, the headrest and webbing retainer support member further including:
   a second upper seatbelt webbing contact portion disposed to a second side of the midline, and extending laterally and downward from the extension portion;
   a second attachment section extending downward from the second upper seatbelt webbing contact portion; and
   a second seatbelt webbing retaining member disposed to a second side of the midline, the second seatbelt webbing retaining member having a medial end, a lateral end further away from the midline than the medial end, and a middle portion between the medial end and the lateral end;
   wherein, the medial end of the second seatbelt webbing retaining member is affixed and the lateral end is releasably coupled to the second attachment section of the headrest and webbing retainer support member; and
   wherein, the middle portion is disposed above the second upper seatbelt webbing contact portion forming a gap configured to retain a second upper seatbelt webbing; the seatbelt assembly of the vehicle further comprising a second webbing section; the method further comprising:
   releasing the releasably coupled lateral end of the second seatbelt webbing retaining member;
   placing the second webbing section of the seatbelt assembly between the second upper seatbelt webbing contact portion and the second seatbelt webbing retaining member so that the second webbing section contacts the second upper seatbelt webbing contact portion; and
   recoupling the releasably coupled lateral end of the second seatbelt webbing retaining member that was previously released.

12. The method of claim 11,
wherein, the first upper seatbelt webbing contact portion slopes downward away from the midline;
wherein, the second upper seatbelt webbing contact portion slopes downward away from the midline;
the method further comprising:
   positioning the first webbing section on the first upper seatbelt webbing contact portion to accommodate a height of the occupant; and
   positioning the second webbing section on the second upper seatbelt webbing contact portion to accommodate the height of the occupant.

13. The method of claim 11,
wherein, the first attachment section includes a magnet;
wherein, the second attachment section includes a magnet;
wherein, the lateral end of the first seatbelt webbing retaining member includes a metal piece; and
wherein, the lateral end of the second seatbelt webbing retaining member includes a metal piece;

wherein, the lateral end of the first seatbelt webbing retaining member is releasably coupled to the first attachment section because the metal piece of the lateral end of the first seatbelt webbing retaining member is magnetically attracted to the magnet of the first attachment section;
wherein, the lateral end of the second seatbelt webbing retaining member is releasably coupled to the second attachment section because the metal piece of the lateral end of the second seatbelt webbing retaining member is magnetically attracted to the magnet of the second attachment section;
wherein, releasing the releasably coupled lateral end of the first seatbelt webbing retaining member from the first attachment section of the headrest and webbing retainer support member includes overcoming the magnetic attraction between the metal piece of the lateral end of the first seatbelt webbing retaining member and the magnet of the first attachment section; and
wherein, releasing the releasably attached lateral end of the second seatbelt webbing retaining member from the second attachment section of the headrest and webbing retainer support member includes overcoming the magnetic attraction between the metal piece of the lateral end of the second seatbelt webbing retaining member and the magnet of the second attachment section.

14. The method of claim 11,
the upper back support section including a top portion; and
the headrest is disposed above the top portion of the upper back support section;
wherein, the medial end of the first seatbelt webbing retaining member and the medial end of the second seatbelt webbing retaining member are affixed to the extension portion;
wherein, placing the first webbing section of the seatbelt assembly between the first upper seatbelt webbing contact portion and the first seatbelt webbing retaining member includes placing the first webbing section of the seatbelt assembly laterally of the extension portion away from the midline; and
wherein, placing the second webbing section of the seatbelt assembly between the second upper seatbelt webbing contact portion and the second seatbelt webbing retaining member includes placing the second webbing section of the seatbelt assembly laterally of the extension portion away from the midline.

15. The method of claim 11,
the extension portion comprising a first member and a second member;
wherein, the medial end of the first seatbelt webbing retaining member is affixed to the first member of the extension portion;
wherein, the medial end of the second seatbelt webbing retaining member is affixed to the second member of the extension portion;
wherein, placing the first webbing section of the seatbelt assembly between the first upper seatbelt webbing contact portion and the first seatbelt webbing retaining member includes placing the first webbing section of the seatbelt assembly laterally of the first member of the extension portion away from the midline; and
wherein, placing the second webbing section of the seatbelt assembly between the second upper seatbelt webbing contact portion and the second seatbelt webbing retaining member includes placing the second webbing section of the seatbelt assembly laterally of the second member of the extension portion away from the midline.

16. The method of claim 11, wherein, the lateral end of the first seatbelt webbing retaining member is releasably coupled through magnetic attraction;

wherein, the lateral end of the second seatbelt webbing retaining member is releasably coupled through magnetic attraction;

wherein, releasing the releasably coupled lateral end of the first seatbelt webbing retaining member includes overcoming the magnetic attraction releasably coupling the first seatbelt webbing retaining member; and wherein, releasing the releasably coupled lateral end of the second seatbelt webbing retaining member includes overcoming the magnetic attraction releasably coupling the second seatbelt webbing retaining member.

17. The method of claim 10 further comprising:

securing the seatbelt assembly over an occupant of the seating assembly.

18. A vehicle seating assembly comprising:

a headrest;

a seatback having a rearward facing surface;

a support member connected to the rearward facing surface, supporting the headrest above the seatback, and providing a seatbelt webbing contact portion; and a seatbelt webbing retaining member extending from the support member, forming a gap above the seatbelt webbing contact portion, and having an end that is releasably coupled to allow selective placement of seatbelt webbing through the gap.

19. The vehicle seating assembly of claim 18 further comprising:

a second seatbelt webbing retaining member extending from the support member, forming a gap above the seatbelt webbing contact portion to retain a second seatbelt webbing of a seatbelt assembly that also includes the seatbelt webbing, and having an end that is releasably coupled to allow selective placement of the second seatbelt webbing through the gap.

20. The vehicle seating assembly of claim 18, the support member further including an attachment section; and the end that is releasably coupled is releasably coupled via magnetic attraction to the attachment section and rearward of an occupant facing surface of the seatback.

\* \* \* \* \*